United States Patent
Wang

(10) Patent No.: US 7,562,539 B2
(45) Date of Patent: Jul. 21, 2009

(54) METHOD AND THE DEVICE FOR MAKING HIGH PRECISION COATING OF INSERT FOR GLASS MOLDING

(75) Inventor: Kun-Chih Wang, Taichung Hsien (TW)

(73) Assignee: Asia Optical Co., Inc., Taichung (TW)

( * ) Notice: Subject to any disclaimer, the term of this patent is extended or adjusted under 35 U.S.C. 154(b) by 511 days.

(21) Appl. No.: 11/011,130

(22) Filed: Dec. 15, 2004

(65) Prior Publication Data
US 2005/0150253 A1 Jul. 14, 2005

(30) Foreign Application Priority Data
Jan. 12, 2004 (TW) .............................. 93100635 A

(51) Int. Cl.
*C03B 40/00* (2006.01)
(52) U.S. Cl. ...................................................... 65/169
(58) Field of Classification Search .................... 65/169
See application file for complete search history.

(56) References Cited
U.S. PATENT DOCUMENTS 3,775,644 A * 11/1973 Cotner et al. ................ 361/769
4,721,518 A * 1/1988 Monji et al. .............. 65/374.11

* cited by examiner

*Primary Examiner*—Philip C Tucker
*Assistant Examiner*—Michael J Felton

(57) ABSTRACT

A method for making high precision hard film coating on a mold core comprises the following steps of: (a) providing a mold jig (200, 300) and a mold core (208, 308); (b) defining a through hole (206, 364) of a first inner diameter in the mold jig; (c) forming a rim (254, 354) of a second inner diameter on the inner side of the through hole, the second inner diameter being smaller than the first inner diameter; (d) configuring the mold core into a mold core including a body (212, 312) of a first external diameter and a top portion (250, 350) of a second external diameter, the second external diameter being smaller than the first external diameter to define a shoulder (252, 352) between the body and the top portion, the first external diameter being substantially equal to the first inner diameter and larger than the second inner diameter, the second external diameter being substantially equal to or smaller than the second inner diameter; and (e) coreing the mold core into the through hole of the mold jig from the bottom, the shoulder of the mold core engaging with the rim, the upper surface of the top portion of the mold core being substantially flush with the upper surface of the mold jig, and a groove (256, 356) being defined between the inner side of the through hole and the outer side of the top portion of the mold core. A device for performing this method is also disclosed.

6 Claims, 4 Drawing Sheets

METHOD AND THE DEVICE FOR MAKING HIGH PRECISION COATING OF INSERT FOR GLASS MOLDING

BACKGROUND OF THE INVENTION

1. Field of the Invention

The present invention relates to film coating of a mold core for glass molding, and particularly relates to a method and device for making high precision hard film coating of a mold core for glass molding.

2. Description of Prior Art

Hard film coating of a mold core is one of the most important factors contributing to glass molding success. The hard film coating has a determinative influence on the surface quality of the resultant optical glass lens. Further, the life expectancy of the mold core is also influenced by the hard film coating process, which directly affects the production cost.

Currently, PVD (Physical Vapor Deposition) processes, such as evaporation, sputtering and ion plating, are commonly applied to efficiently form a hard film coating on the outer surface of the mold core.

In the film coating process, mold jigs are generally employed to increase the coating efficiency and productivity. However, some disadvantages are presented when using conventional mold jigs in film coating processes. These disadvantages include large eccentricity of the mold jig, peeling or cracks of the resultant hard film from the mold core, poor molding process regularity, insufficient adhering strength of the hard film relative to the mold core, poor precision of the external diameter of the coated mold core, and difficulties in precision machining of the coated mold core.

FIG. 1 shows a conventional mold jig 100 for use in the hard film coating process of a mold core for glass molding. The mold jig 100 is in a planar, rectangular or circular shape, and has a first surface 102 and an opposite second surface 104. For facilitating description, the first surface 102 and the second surface 104 are hereinafter referred to as the upper surface and the lower surface, respectively. However, it should be understandable that these direction related terms are for illustrative purposes only, and are not restrictive.

A plurality of through holes 106 (only one shown for simplification) is defined between the upper surface 102 and the lower surface 104 of the mold jig 100. For facilitating description, this direction, i.e., the direction between the upper surface 102 and the lower surface 104, is hereinafter referred to as an axial direction. The direction perpendicular to this axial direction, or parallel to the upper surface 102 and the lower surface 104, is hereinafter referred to as a radial direction.

Each through hole 106 receives one mold core 108 having a molding surface with a hard film 110 deposited thereon by PVD process. The mold core 108 includes a body 112 firmly received in the through hole 106 and extending in the axial direction. The body 112 projects beyond the upper surface 102 of the mold jig 100, and its exposed upper surface forms the molding surface of the mold core 108.

The thickness of the planar mold jig 100, i.e., the dimension between the upper surface 102 and the lower surface 104, is smaller than the thickness of the mold core 108, i.e., the axial dimension of the mold core 108. Therefore, the molding surface of the mold core 108 projects beyond the upper surface 102 of the mold jig 100 when the body 112 of the mold core 108 is received in the through hole 106.

The mold core 108 further includes a base 114 connected with the body 112. The base 114 has an outwardly projecting flange 116, whereby a step portion is formed together with the body 112 to hold the mold core 108 on the lower surface 104 of the mold jig 100. An end stop 118 presses on the base 114 to further hold the mold core 108 in the through hole 106.

As the body 112 of the mold core 108 projects beyond the upper surface 102 of the mold jig 100, the hard film 110 will be deposited on both the exposed molding surface and side surface of the mold core 108 and thus has a sufficient adhering strength relative to the body 112. However, since the body 112 of the mold core 108 projects beyond the upper surface 102 of the mold jig 100 to a great extent, a large portion of the side surface of the body 112 will be exposed for deposition, whereby a thick and irregular side film 120 will be inevitably formed on the exposed side surface portion of the body 112.

As shown in FIG. 2, in the glass molding process applying this mold core 108, when the thus coated mold core 108 is coreed into a mold cavity 902 of the mold 900, the thick and irregular side film 120 on the body 112 will bring the eccentric or tilting problem. That is, the axial line 122 of the mold core 108 will be offset from, or tilted relative to the axial line 904 of the mold cavity 902. In some serious cases, even the base 114 of the mold core 108 and the clamp 906 cannot correct this eccentricity or tilting. Therefore, this mold core 108 cannot be applied in molding processes requiring for high centricity. When applied, in the following assembling or machining processes, the irregular side film 120 will also tend to peel or crack from the mold core 108, which has a bad impact on the yield of the glass molding process.

Further, since the mold core 108 projects too much relative to the mold jig 100, the process regularity of the PVD process and thus the quality of the coated film will also be adversely affected.

FIG. 3 shows another conventional mold jig 100a for use in the hard film coating process of a mold core for glass molding. Similarly, a through hole 106a is defined between upper and lower surfaces 102a, 104a of the mold jig 100a for receiving a mold core 108a therein. In this technology, the height of the body 112 of the mold core 108a is substantially equal to the thickness of the mold jig 100a, and thus the upper molding surface of the mold core 108a is substantially flush with the upper surface 102a of the mold jig 100a. A chamfer 124 is defined between the upper surface 102a of the mold jig 100a and the inner side of the through hole 106a to expose an upper portion of the side surface of the body 112 of the mold core 108a. Thus, in coating process, a side film 120a will be deposited on this exposed upper portion of the side surface of the body 112 except for the upper film of the resultant hard film 110. The extending depth of the side film 120a along the axial direction of the mold core 108a is restricted by the depth of the chamfer 124, and thus the extending depth of this side film 120a is smaller than that of the side film 120 in FIGS. 1 and 2.

The above coating technology ensures the adhering strength of the resultant hard film 110 relative to the mold core 108a, since the hard film 110 is coated on both upper and side surfaces of the mold core 108a. However, the eccentricity or tilting problem may still be present in the following molding processes, although it is mitigated relative to that of the technology in FIGS. 1 and 2.

Additionally, although the upper molding surface of the mold core 108a is flush with the upper surface 102a of the mold jig 100a so that the regularity of the PVD process is improved, the coated side film 120a may still adversely affect the yield of the molding process due to the eccentricity or tilting problem.

FIG. 4 shows a further conventional mold jig 100b for use in the hard film coating process of a mold core for glass molding. Similarly, a through hole 106b is defined between upper and lower surfaces 102b, 104b of the mold jig 100b for receiving a mold core 108b therein. In this technology, the height of the body 112 of the mold core 108b is substantially equal to the thickness of the mold jig 100b, and thus the upper molding surface of the mold core 108b is substantially flush with the upper surface 102b of the mold jig 100b. What is different from the technology as shown in FIG. 3 is that no chamfer is defined in the mold jig 100b. Therefore, when assembled, the upper molding surface of the mold core 108b is continuous with the upper surface 102b of the mold jig 100b to form a continuous plane. A continuous hard film 110 thus can be deposited on this continuous plane by PVD process. This coating method ensures that the hard film 110 will be deposited on the upper molding surface of the mold core 108b and no hard film will be deposited on the side surface of the body 112 of the mold core 108b. Accordingly, the regularity of the PVD process can be improved to obtain the relatively high quality hard film 110. However, since no hard film is coated on the side surface of the body 112 of the mold core 108b, the adhering strength of the obtained hard film 110 relative to the mold core 108b is diminished. This may result in peeling or cracks of the obtained hard film 110 from the mold core 108b in the following mold assembling or glass molding processes, which has a bad impact on the yield of the glass molding process.

Clearly, none of the above mentioned prior art technologies can ensure both the precision of the hard film coating on the mold core and the sufficient adhering strength of the hard film.

Therefore, to overcome these problems encountered by the prior art, a method and device are required for making hard film coating of high precision and sufficient adhering strength on a mold core for glass molding.

SUMMARY OF THE INVENTION

The main object of the present invention is to provide a method for making high precision hard film coating on a mold core for glass molding, which is obtained by a shoulder-and-rim engagement between the mold core and a mold jig to overcome the eccentricity problem.

Another object of the present invention is to provide a method for making high precision hard film coating on a mold core for glass molding, which ensures sufficient adhering strength of the resultant hard film relative to the mold core, and thus extends the life expectancy of the mold core and improves the product yield.

A further object of the present invention is to provide a device for making high precision hard film coating on a mold core for glass molding, which maintains the external diameter accuracy of the mold core after molding processes, thereby increasing the engagement precision between the mold core and a corresponding mold cavity and decreasing the eccentricity phenomenon occurrence in the resultant molding products.

To achieve the above objects of the present invention, a method for making high precision hard film coating on a mold core for glass molding in accordance with the present invention comprises the following steps of: (1) providing a mold jig and a mold core to be received in the mold jig; (2) defining a through hole of a first inner diameter in the mold jig for receiving the mold core therein; (3) forming a rim of a second inner diameter on the inner side of the through hole of the mold jig, the second inner diameter being smaller than the first inner diameter of the through hole; (4) configuring the mold core into a mold core including a body of a first external diameter and a top portion of a second external diameter extending from the body, the second external diameter being smaller than the first external diameter to define a shoulder between the body and the top portion, the first external diameter being substantially equal to the first inner diameter of the through hole of the mold jig and larger than the second inner diameter of the rim of the mold jig, the second external diameter being substantially equal to or smaller than the second inner diameter of the rim; and (5) coreing the mold core into the through hole of the mold jig from the bottom, the shoulder of the mold core engaging with the rim of the mold jig, the upper surface of the top portion of the mold core being substantially flush with the upper surface of the mold jig, and a groove being defined between the inner side of the through hole of the mold jig and the outer side of the top portion of the mold core. A device for performing this method is also disclosed.

BRIEF DESCRIPTION OF THE DRAWINGS

The present invention may best be understood through the following description with reference to the accompanying drawings, in which.

DETAILED DESCRIPTION OF THE INVENTION

Figure 1:
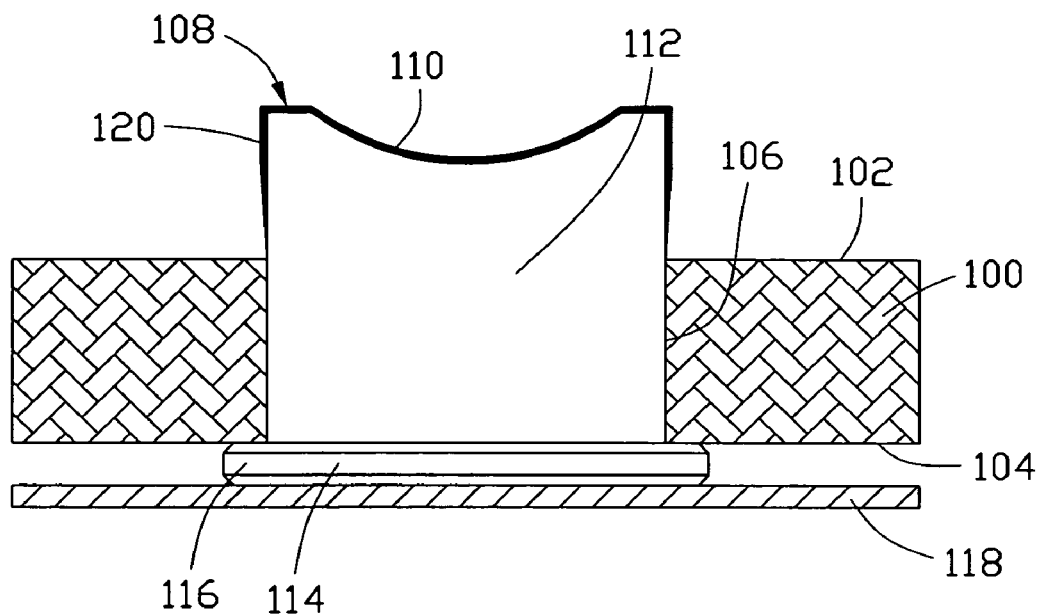
FIG. 1 is a cross-sectional view illustrating a conventional mold jig and mold core assembly for hard film coating.
Figure 2:
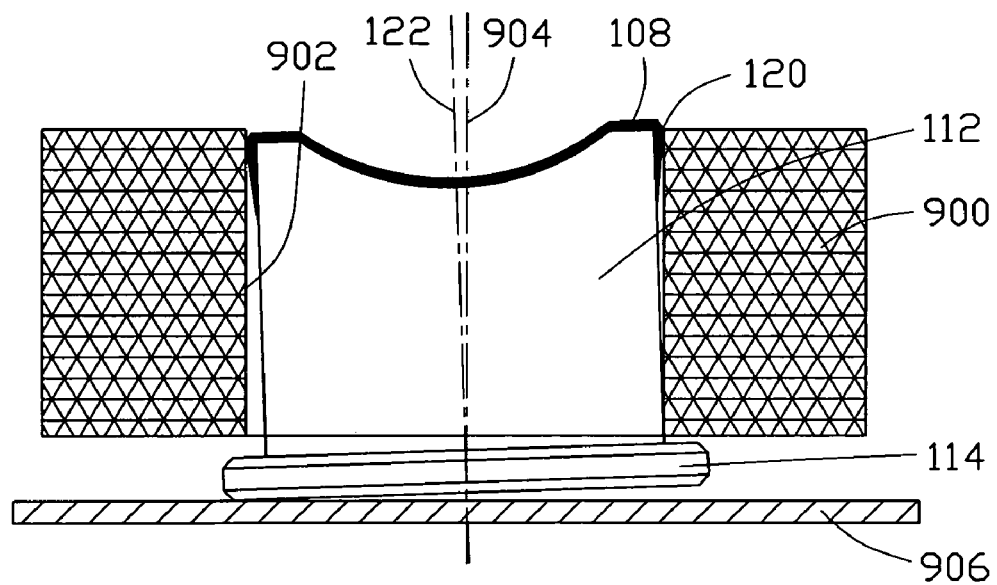
FIG. 2 is a cross-sectional view illustrating the eccentricity phenomenon occurred between the coated mold core of FIG. 1 and a corresponding mold cavity of a mold.
Figure 3:
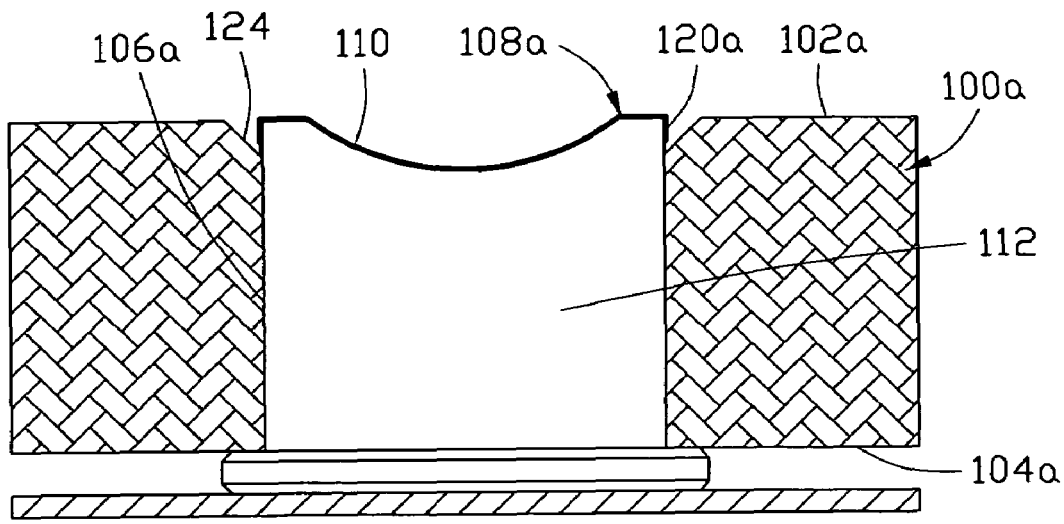
FIG. 3 is a cross-sectional view illustrating another conventional mold jig and mold core assembly for hard film coating.
Figure 4:
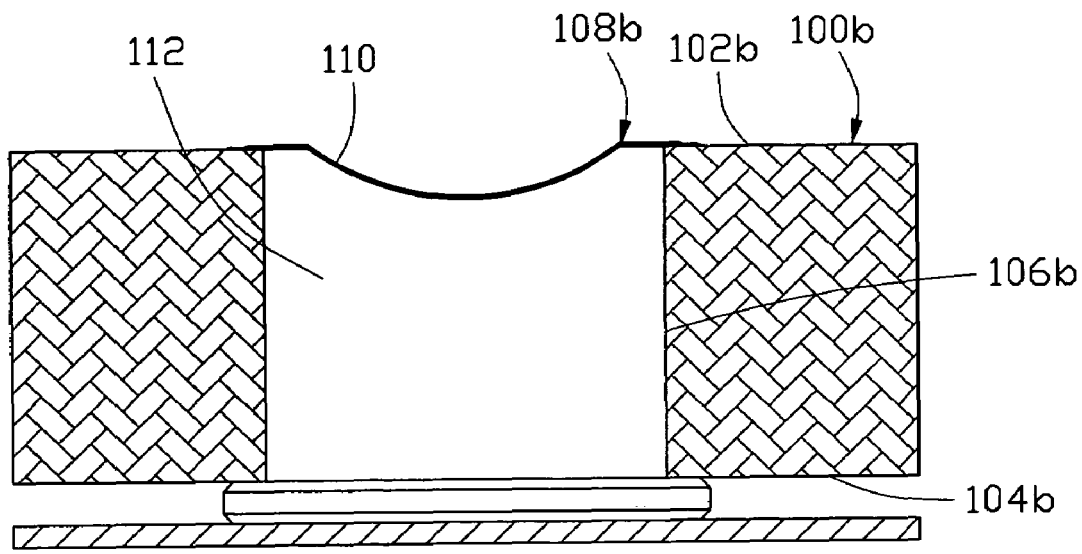
FIG. 4 is a cross-sectional view illustrating a further conventional mold jig and mold core assembly for hard film coating.
Figure 5:
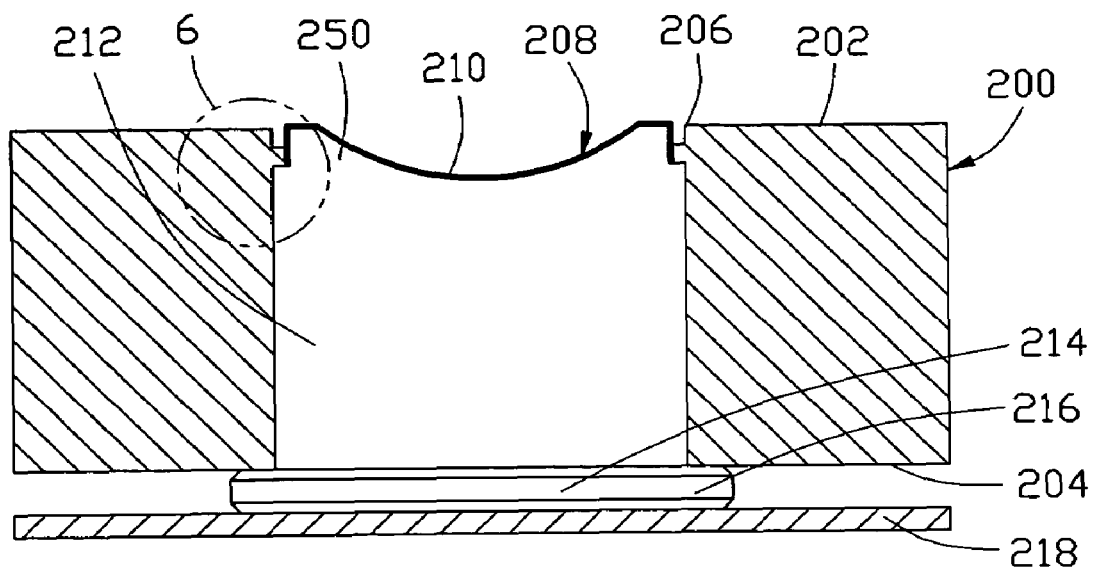
FIG. 5 is a cross-sectional view illustrating a mold jig and mold core assembly for hard film coating in accordance with a first embodiment of the present invention.
Figure 6:
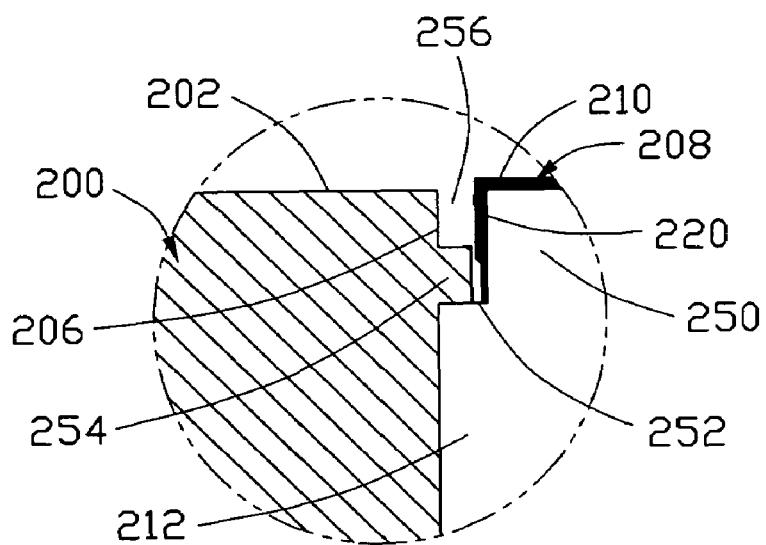
FIG. 6 is an enlarged view of the circled portion 6 in FIG. 5.

FIGS. 5 and 6 illustrate a first embodiment of the present invention. The mold jig is designated by 200 and has a conventional planar shape. The mold jig 200 defines a plurality of through holes 206 between opposite upper and lower surfaces 202, 204 thereof along the axial direction.

For simplicity, only one through hole 206 is shown in FIGS. 5 and 6. However, it should be understood that the present invention can be applied in single through hole application or multiple through hole application.

A mold core 208 is coreed into the through hole 206 of the mold jig 200. The mold core 208 has a body 212 fittingly received in the through hole 206 of the mold jig 200. The body 212 of the mold core 208 extends along the axial direction of the through hole 206 and upwardly exposes its upper molding surface for allowing a hard film 210 deposited thereon by PVD process.

In the present invention, to ensure the regularity of the PVD process, the height of the mold core 208 is substantially equal to the thickness of the mold jig 200, whereby the upper molding surface of the mold core 208 is substantially flush with the upper surface 202 of the mold jig 200.

The mold core 208 further includes a base 214 connected with the body 212. The base 214 has a flange 216 projecting in a radial direction, whereby a step portion is formed together with the body 212 to hold the mold core 208 on the lower surface 204 of the mold jig 200. An end stop 218 presses on the base 214 to further hold the mold core 208 in the through hole 206.

A top portion 250 upperwardly and coaxially extends from the body 212 of the mold core 208. The upper surface of the top portion 250 forms the upper molding surface of the mold core 208. The top portion 250 has a diameter smaller than that of the body 212, whereby a stepped shoulder 252 is formed therebetween. According to the present invention, the height of the shoulder 252, i.e., the distance between the bottom of the shoulder 252 and the upper molding surface of the mold core 208 along the axial direction, is preferably to be approximately in the range of 1 mm to 2 mm.

The mold jig 200 further includes a rim 254 projecting from the inner side of the through hole 206 along the radial direction into the through hole 206. The rim 254 is provided at a position corresponding to the shoulder 252 of the mold core 208. The inner diameter of the rim 254 is substantially equal to or preferably a little bit smaller than the depth of the shoulder 252, i.e., the distance between the external diameter of the body 212 of the mold core 208 and the external diameter of the top portion 250. In other words, the inner diameter of the rim 254 is substantially equal to or preferably larger than the external diameter of the top portion 250. Therefore, when the mold core 208 is coreed into the through hole 206 from the bottom, the top portion 250 of the mold core 208 can pass through the through hole 206 with its shoulder 252 engaging with the rim 254 of the mold jig 200.

Additionally, it should be understood that, the inner diameter of the rim 254 should also be smaller than the external diameter of the body 212 while substantially equal to or larger than the external diameter of the top portion 250, so that the rim 254 of the mold jig 200 can rest on the shoulder 252 of the mold core 208.

An upwardly exposed groove 256 is defined between the outer side surface of the top portion 250 of the mold core 208 and the inner side of the through hole 206 of the mold jig 200. The rim 254 forms the bottom of the groove 256. During the PVD process, coating materials will be deposited on the outer side surface of the top portion 250 to form a side hard film 220. This side hard film 220 increases the adhering strength of the resultant hard film 210 relative to the mold core 208. Simultaneously, due to the provision of the shoulder 252 of the mold core 208, the side hard film 220 will not be further formed on the outer side surface of the body 212 which is adapted to engage with a mold cavity during following molding processes. Accordingly, the engagement precision between the mold core 208 and the mold is efficiently ensured and thus the yield of the glass molding process is significantly increased.

Figure 7:
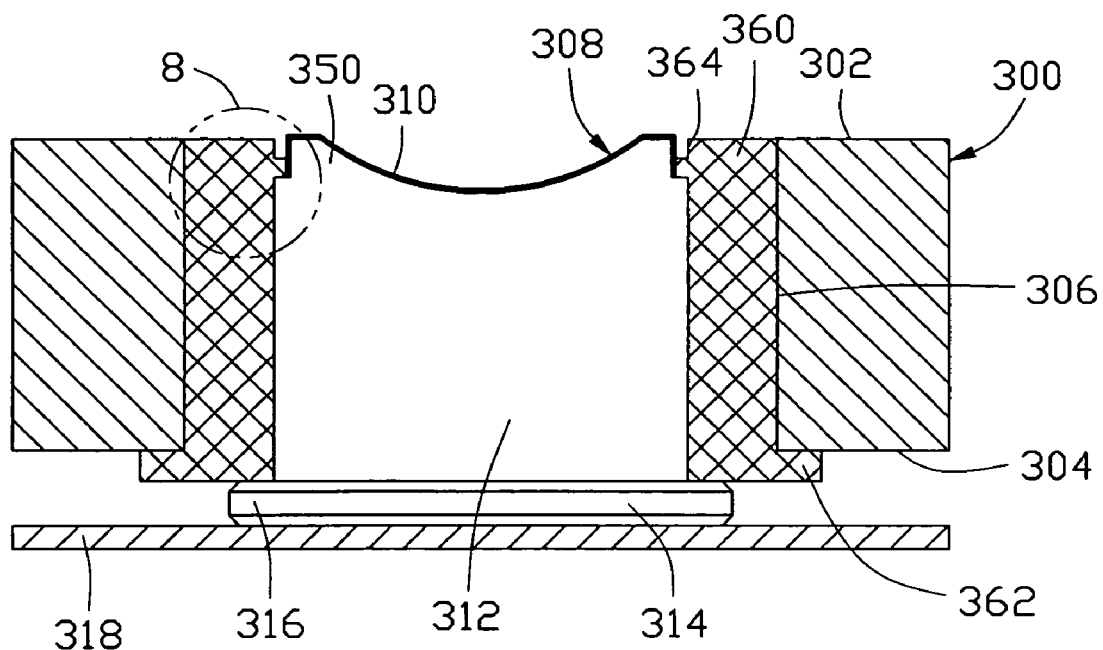
FIG. 7 is a cross-sectional view illustrating a mold jig and mold core assembly for hard film coating in accordance with a second embodiment of the present invention.
Figure 8:
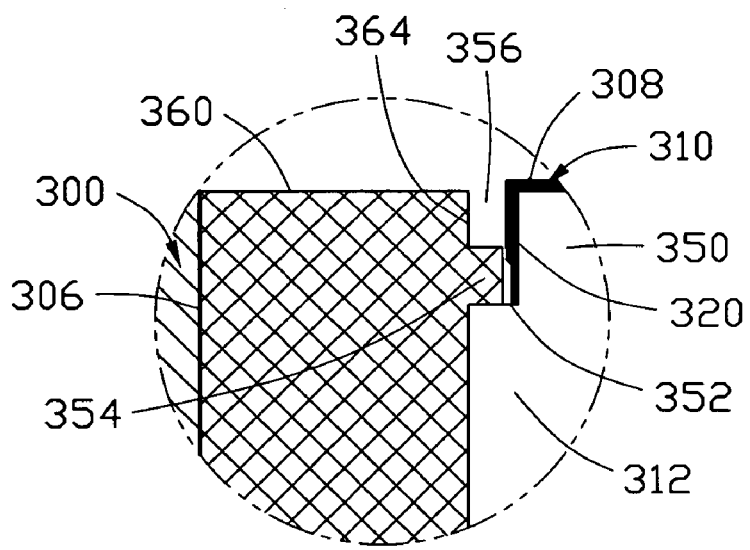
FIG. 8 is an enlarged view of the circled portion 8 in FIG. 7.

FIGS. 7 and 8 illustrate a second embodiment of the present invention. The mold jig 300 is planar, and has an upper surface 302 and an opposite lower surface 304 with a plurality of holes 306 defined therebetween along the axial direction. For simplicity, only one through hole 306 is shown in FIGS. 7 and 8.

The mold jig 300 further includes a bushing 360 fittingly received in the hole 306 with an upper surface thereof substantially flush with the upper surface 302. An outwardly projecting flange 362 is formed at the bottom of the bushing 360. The flange 362 abuts against the lower surface 304, thereby holding the bushing 360 on the lower surface 304. The bushing 360 further has a through hole 364 defined therein and a rim 354 projecting from the inner side of the through hole 364 along the radial direction into the through hole 364.

The through hole 364 of the bushing 360 receives a mold core 308 therein. The mold core 308 includes a body 312 fittingly received in the through hole 364 of the bushing 360, and a top portion 350 upperwardly and coaxially extending from the body 312. The upper surface of the top portion 350 is exposed to form the upper molding surface of the mold core 308.

The top portion 350 of the mold core 308 has a diameter smaller than that of the body 312, whereby a stepped shoulder 352 is formed therebetween. Similar to the first embodiment of the present invention, the height of the shoulder 352 is preferably to be approximately in the range of 1 mm to 2 mm.

To ensure the regularity of the PVD process, the upper surface of the mold core 308 is set to be substantially flush with the upper surface of the bushing 360. When necessary, the upper surface 302 may be also set to be substantially flush with the upper surfaces of the mold core 308 and the bushing 360.

The mold core 308 further includes a base 314 connected with the body 312. The base 314 has a flange 316 outwardly projecting in a radial direction, whereby a step portion is formed together with the body 312 to hold the mold core 308 on the lower surface of the bushing 360, thereby retaining the mold core 308 in the through hole 364 of the bushing 360. An end stop 318 presses on the base 314 to further hold the mold core 308 in the bushing 360.

The rim 254 in the through hole 364 of the bushing 360 is provided at a position corresponding to the shoulder 352 of the mold core 308. The inner diameter of the rim 354 is substantially equal to or preferably a little bit larger than the external diameter of the top portion 350 of the mold core 308. Therefore, when the mold core 308 is coreed into the through hole 364 of the bushing 360 from the bottom, the top portion 350 of the mold core 308 can pass through the through hole 364 with its shoulder 352 engaging with the rim 354 of the bushing 360.

It should be understood that, the inner diameter of the rim 354 of the bushing 360 should also be smaller than the external diameter of the body 312 of the mold core 308 while substantially equal to or larger than the external diameter of the top portion 350, so that the rim 354 can rest on the shoulder 352 of the mold core 308.

An upwardly exposed groove 356 is defined between the outer side surface of the top portion 350 of the mold core 308 and the inner side of the through hole 364 of the bushing 360. The rim 354 forms the bottom of the groove 356. During the PVD process, coating materials will be deposited on the outer side surface of the top portion 350 to form a side hard film 320. This side hard film 320 increases the adhering strength of the resultant hard film 310 relative to the mold core 308. Simultaneously, due to the provision of the shoulder 352 of the mold core 308, the side hard film 320 will not be further formed on the outer side surface of the body 312 which is adapted to engage with a mold cavity during following molding processes. Accordingly, the engagement precision between the mold core 308 and the mold is efficiently ensured and thus the yield of the glass molding process is significantly increased.

Due to the provision of the bushing 360, it is not required that a plurality of high precision through holes be defined in the mold jig 300. Only one or several high precision bushings 360 need to be manufactured for being received in the mold jig 300 to perform the same functions as the plurality of high precision through holes 206 as in the first embodiment. Accordingly, the manufacture is simplified and the production cost is reduced.

From the above detailed description, it is clear that, even when high engagement precision is required between the mold core and a corresponding mold cavity, the method and device of the present invention can still satisfy both requirements of sufficient adhering strength of the resultant hard film relative to the mold core and no hard film coated on the body of the mold core. The external diameter accuracy of the mold core is thus maintained after molding processes, thereby preventing the occurrence of the eccentricity phenomenon in the resultant molding products and increasing the yield of the glass molding processes.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for making high precision film coating on a mold core comprising the following steps:
   (1) providing a mold jig and a mold core to be received in the mold jig;
   (2) defining a through hole of a first inner diameter in the mold jig for receiving the mold core therein;
   (3) forming a rim of a second inner diameter on the inner side of the through hole of the mold jig, the second inner diameter being smaller than the first inner diameter of the through hole;
   (4) forming a body of a first external diameter and a top portion of a second external diameter in the mold core, the second external diameter being smaller than the first external diameter to define a shoulder between the body and the top portion, the first external diameter being substantially equal to the first inner diameter of the through hole of the mold jig and larger than the second inner diameter of the rim of the mold jig, the second external diameter being substantially equal to or smaller than the second inner diameter of the rim;
   (5) inserting the mold core into the through hole of the mold jig from a bottom of the mold jig, wherein firstly the top portion, the shoulder and the body of the mold core are successively inserted into the through hole of the first inner diameter from the bottom of the mold jig, and then the top portion of the second external diameter passes through the rim of the second inner diameter, and finally the shoulder of the mold core engages with the rim of the mold jig, the body of the first external diameter being received in the through hole of the first inner diameter, the upper surface of the top portion of the second external diameter being substantially flush with the upper surface of the mold jig, and a groove being defined between the inner side of the through hole of the first inner diameter and the outer side of the top portion of the second external diameter; and
   (6) coating the mold core to form a side hard film on the outer side surface of the top portion of the second external diameter and a hard film on the upper surface of the top portion of the second external diameter.

2. The method for making high precision film coating on a mold core as claimed in claim 1, wherein the distance between the shoulder of the mold core and the upper surface of the top portion of the mold core is approximately in the range of 1 mm to 2 mm.

3. The method for making high precision film coating on a mold core as claimed in claim 1, wherein the through hole of the mold jig is configured by a bushing in the mold jig.

4. The method for making high precision film coating on a mold core as claimed in claim 3, wherein the bushing comprises an outwardly projecting flange at the bottom thereof, the flange abutting against a lower surface of the mold jig.

5. The method for making high precision film coating on a mold core as claimed in claim 3, wherein the mold core comprises a base connected with the body, the base having an outwardly projecting flange abutting against a lower surface of the bushing.

6. The method for making high precision film coating on a mold core as claimed in claim 3, wherein the bushing has an upper surface substantially flush with the upper surface of the mold core.

* * * * *